United States Patent [19]
Maruyama

[11] Patent Number: 5,593,179
[45] Date of Patent: Jan. 14, 1997

[54] AIR BAG DEVICE FOR VEHICLE

[75] Inventor: Shigenori Maruyama, Shiga, Japan

[73] Assignee: Takata Corporation, Tokyo, Japan

[21] Appl. No.: 492,588

[22] Filed: Jun. 9, 1995

[30]  Foreign Application Priority Data

Jun. 13, 1994 [JP] Japan .................................. 6-130329

[51] Int. Cl.⁶ .................................................. B60R 21/28
[52] U.S. Cl. .................... 280/740; 280/743.1; 280/743.2
[58] Field of Search .................................... 280/729, 739, 280/740, 743.1, 743.2

[56]  References Cited

U.S. PATENT DOCUMENTS

| | | | |
|---|---|---|---|
| 3,929,350 | 12/1975 | Pech | 280/729 |
| 4,265,468 | 5/1981 | Suszko et al. | 280/729 |
| 5,310,214 | 5/1994 | Cuevas | 280/729 |
| 5,427,410 | 6/1995 | Shiota et al. | 280/729 |

*Primary Examiner*—Kenneth R. Rice
*Attorney, Agent, or Firm*—Kanesaka & Tekeuchi

[57]  ABSTRACT

An air bag is formed of a panel and a guide member fixed between two side portions of the panel. The guide member may be formed of first piece extending diagonally upwardly from a lower end near an opening of the panel to form an upper chamber, and a second piece extending diagonally downwardly from the lower end to form a lower chamber, wherein a middle chamber is defined by the front portion and first and second pieces. Gas generated by an inflator firstly enters into both the upper and lower chambers to expand the same and then flows into the middle chamber to completely inflate the air bag. The guide member may be formed of first and second guide member. The first guide member extends diagonally upwardly from a lower end adjacent the opening to form an upper chamber, and the second guide member extends upwardly from the lower portion of the air bag. A front chamber is defined between a front portion and the second guide member, and a middle chamber is defined between the first and second guide members. The gas generated by the inflator flows into only the upper chamber through the opening, and enters into the middle chamber through the front chamber to fully inflate the air bag.

8 Claims, 4 Drawing Sheets

5,593,179

AIR BAG DEVICE FOR VEHICLE

FIELD OF THE INVENTION

The present invention relates to an air bag device for protecting an occupant in a vehicle by deploying an air bag when the vehicle comes into collision. In particular, the present invention relates to an air bag which allows an upper portion and a front portion of the air bag to be deployed in the early stage of the deployment and then allows the air bag to be fully deployed in its designed configuration finally, even more particularly, to an air bag suitable for an occupant in a passenger seat or a rear seat of a vehicle.

BACKGROUND OF THE INVENTION

An air bag device for an occupant in a passenger seat or a rear seat protects the occupant by deploying an air bag when a vehicle comes into collision. The air bag device has the folded air bag, a retainer or a container for accommodating the air bag, a lid for covering the air bag, and an inflator (gas generator) for deploying the air bag. The air bag device is installed to an instrument panel, a back of a front seat, or the like of the vehicle.

In a conventional air bag device for a vehicle, various measures of improving the output of the inflator and of reducing the volume of the air bag have been taken in order to deploy an air bag rapidly in its fully deployed state to accomplish secure protection of an occupant.

OBJECT AND SUMMARY OF THE INVENTION

It is an object of the present invention to provide an air bag device which is capable of securely protecting an occupant in the early stage of the deployment of the air bag even without changing the volume of the air bag and even when the output of an inflator is reduced.

An air bag for a vehicle of the present invention has a guide member, disposed inside of the air bag, for guiding gases from an inflator to an upper portion and a lower portion of the air bag.

It is preferable that the guide member for gases is formed in a V-like shape in its side view such that an opening of V of its shape faces a front of the air bag. The air bag is preferably provided with vent holes on side surfaces, in an area sandwiched by the V-like shape, of the air bag.

An air bag for a vehicle according to another embodiment of the present invention has a first guide member, disposed inside of the air bag, for guiding gases from an inflator to an upper portion of the air bag and a second guide member extending upwardly from a lower portion near a front of the air bag, for detaining the gases in the front portion of the air bag.

It is preferable that vent holes to be formed in the air bag are disposed below the first guide member and to the rear of the second guide member.

In the air bag according to the present invention, gases generated by the inflator are led to a portion, corresponding to the waist of the occupant, of the air bag by the guide member disposed inside of the air bag to deploy the portion corresponding to the waist of the occupant, thereby restraining the waist of the occupant in the early stage of the deployment.

DESCRIPTION OF THE PREFERRED EMBODIMENTS

Figure 1:
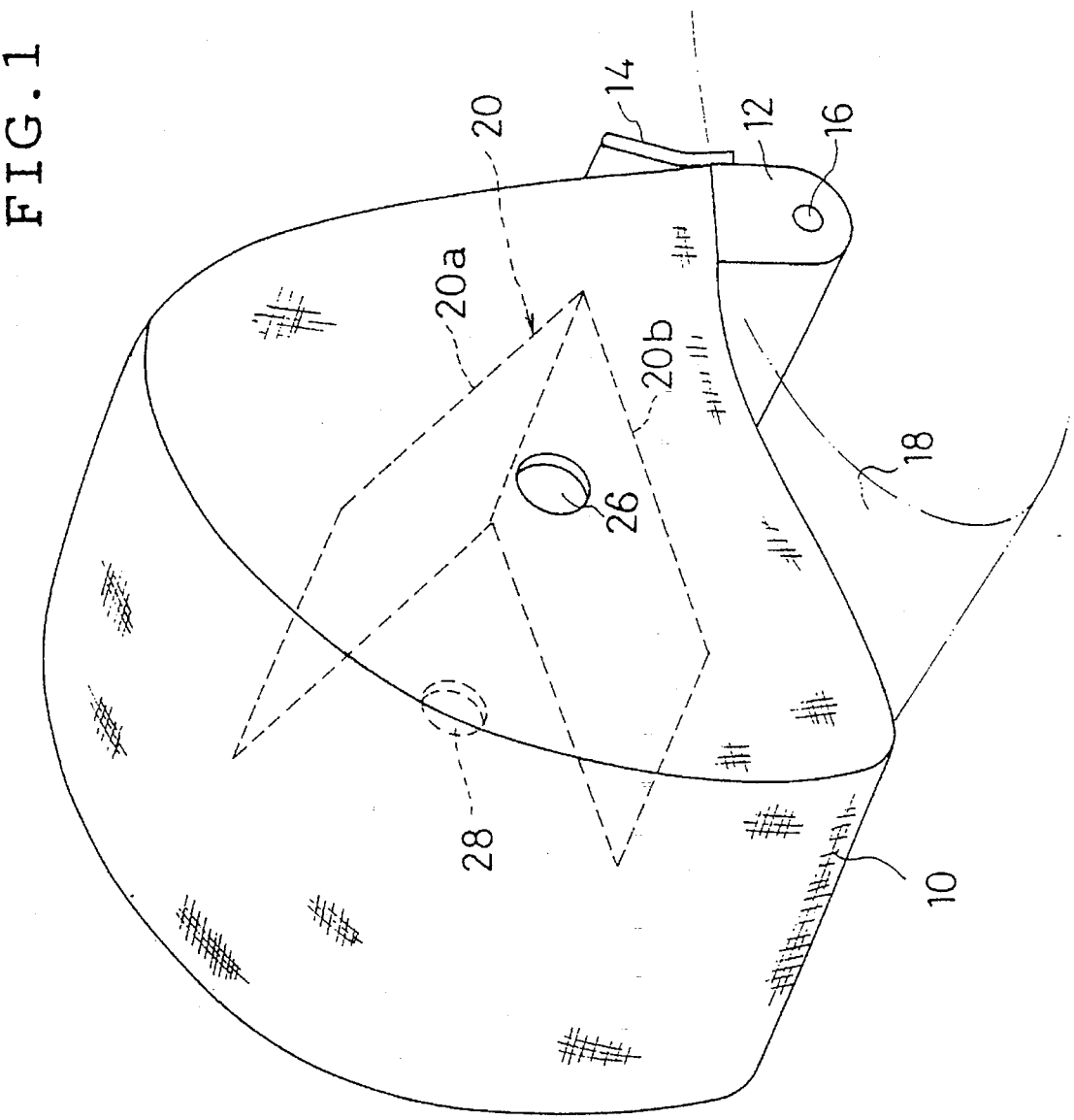
FIG. 1 is a perspective view of an air bag for a vehicle in its deployed state in accordance with an embodiment of the present invention.

Hereinafter, embodiments of the present invention will be described in detail with reference to the drawings. FIG. 1 is a perspective view of an air bag device for a vehicle in its deployed state in accordance with an embodiment of the present invention, FIG. 2 is a longitudinal sectional view showing typical gas flows in an air bag 10 when an inflator 16 is in operation and corresponding to FIG. 1, and FIG. 3 is a sectional view taken along a line III—III in FIG. 2.

Before operation of the air bag device, the air bag 10 is folded neatly and accommodated in a container 12 and a front opening of the container 12 is covered by a lid 14. At the onset of a collision, the inflator 16 operates to start the deployment of the air bag 10. The lid 14 is pressed by the air bag 10 so as to open like a door as shown in the drawings so that the air bag 10 is deployed widely into a vehicle cabin. A numeral 18 designates an instrument panel.

The inside of the air bag 10 is divided into an upper chamber 22, a middle chamber 23, and a lower chamber 24 by a guide member 20 formed in a V-like shape in its side view wherein an opening of V of its shape faces a front of the air bag 10. A numeral 20a designates a first piece which is an upper piece of the guide member 20 and a numeral 20b designates a second piece which is a lower piece of the guide member 20. Right and left sides of the guide member 20 are connected to inner surfaces of both sides of the air bag 10 by sewing. A numeral 25 designates a thread of sewing. The right and left sides of the guide member 20 may be connected by adhesive instead of the sewing.

Figure 2:
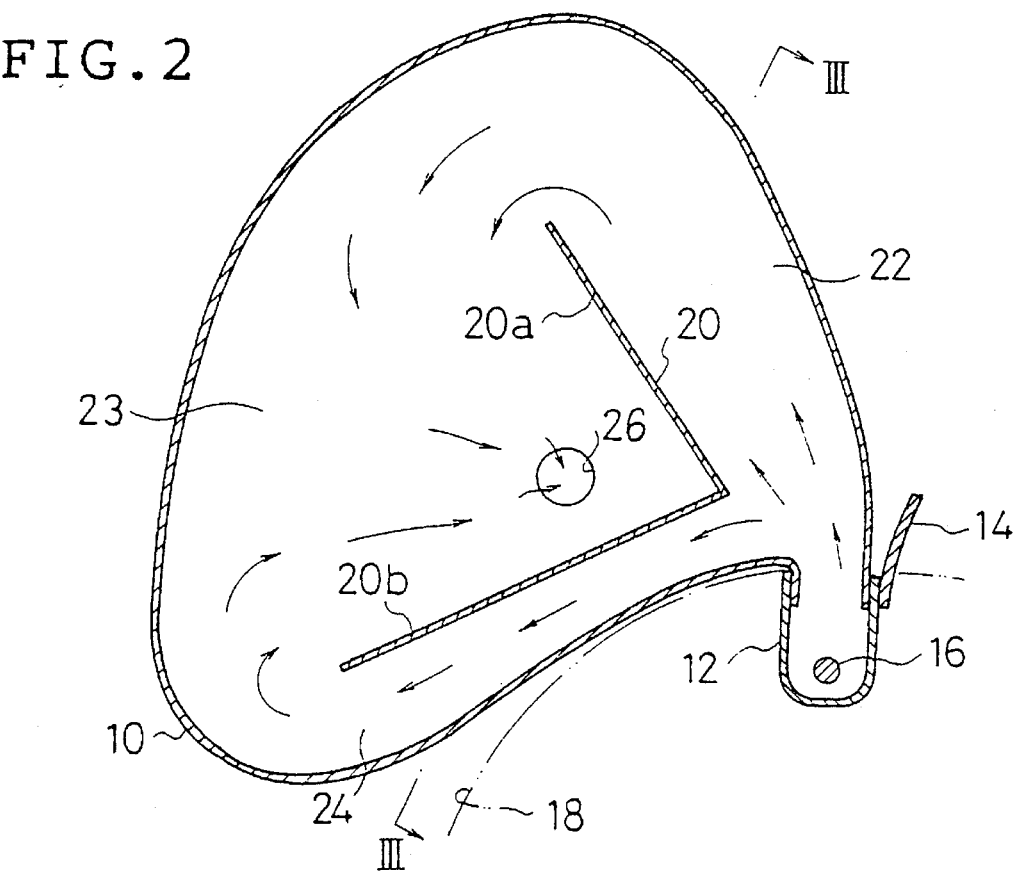
FIG. 2 is a longitudinal sectional view of the air bag in its deployed sate in accordance with the embodiment shown in FIG. 1.
Figure 3:
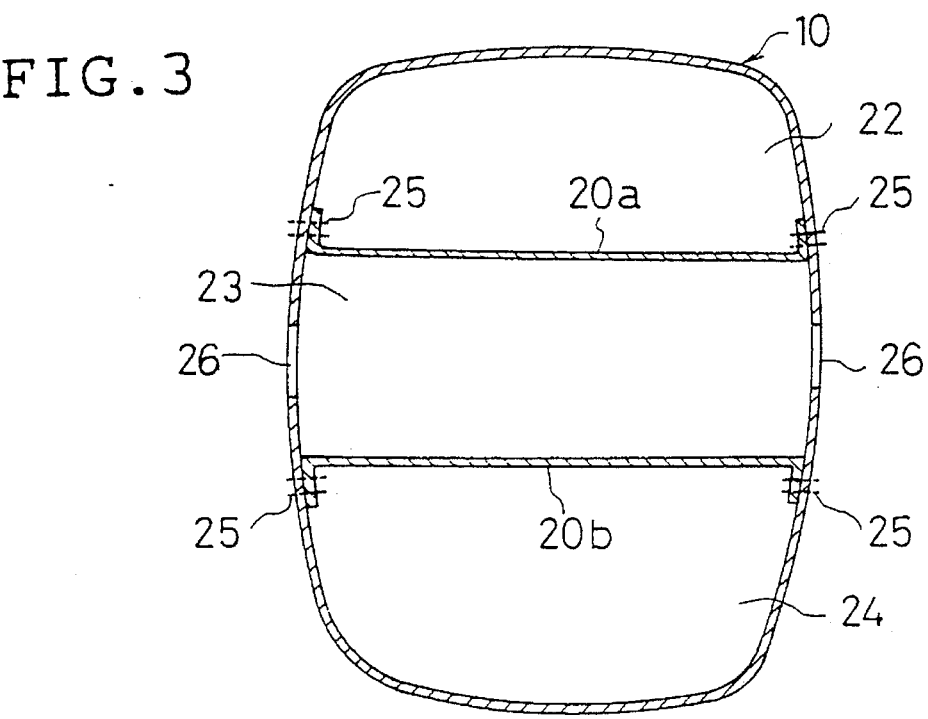
FIG. 3 is a sectional view taken along a line III—III in FIG. 2.

Arrows shown in FIG. 2 represent gas flows generated by the inflator 16 in the air bag device shown in FIG. 1. As shown by the arrows, gases, sent from the inflator 16 into the air bag 10, flow forward through a section disposed above the first piece 20a of the guide member 20 and a section disposed below the second piece 20b of the guide member 20 so as to deploy the upper chamber 22 and the lower chamber 24. After that, the gases bump against an inner front surface of the air bag 10 and then make a U-turn around ends of the first piece 20a and the second piece 20b of the guide member 20 so as to deploy the middle chamber 23.

The air bag 10 is provided with vent holes 26 in the both side surfaces, respectively. The vent holes allow gases in the air bag 10 to be discharged outside the air bag when an occupant plunges into the air bag. Since the vent holes 26 are disposed to face the middle chamber 23 inside of the guide member 20, gases from the inflator 16 do not flow out through the vent holes 26 in the early stage of the deployment of the air bag. Therefore, the upper portion and the lower portion of the air bag 10 are initially deployed rapidly and, after that, the middle portion is deployed.

As described above, the air bag device of the present invention is capable of restraining the waist of the occupant in the early stage of the deployment because of the early deployment of the lower chamber in the air bag 10.

At the onset of a collision, the occupant generally moves forward. In this embodiment, since the lower portion of the air bag 10 is deployed rapidly, the air bag 10 can hold the waist of the occupant in the early stage such that the occupant does not move forward so much. After that, when the upper part of the occupant plunges into the air bag, the air bag can also hold the upper part of the occupant since the air bag 10 is deployed widely as a whole at this point.

Since the vent holes 26 are disposed to face the middle chamber 23, gases are not discharged through the vent holes 26 in the early stage of the deployment of the air bag 10. In addition, in the early stage of the deployment of the air bag 10, the amount of the gases generated by the inflator 16 contributes to deploy the air bag 10. Therefore, the air bag can be deployed quickly even without increasing the output of the inflator or even with a small output of the inflator.

Figure 4:
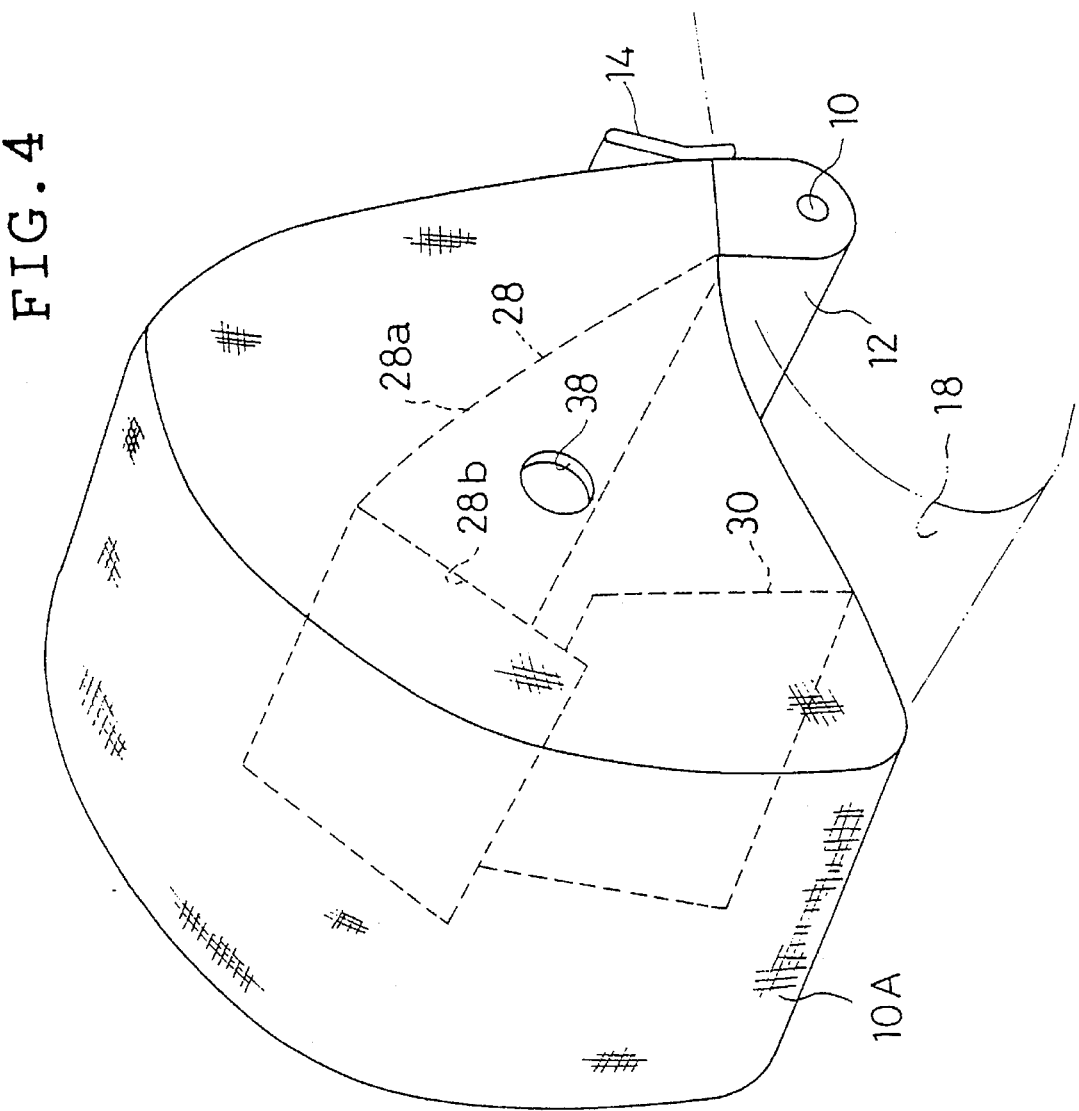
FIG. 4 is a perspective view of an air bag for a vehicle in its deployed state in accordance with another embodiment of the present invention.
Figure 5:
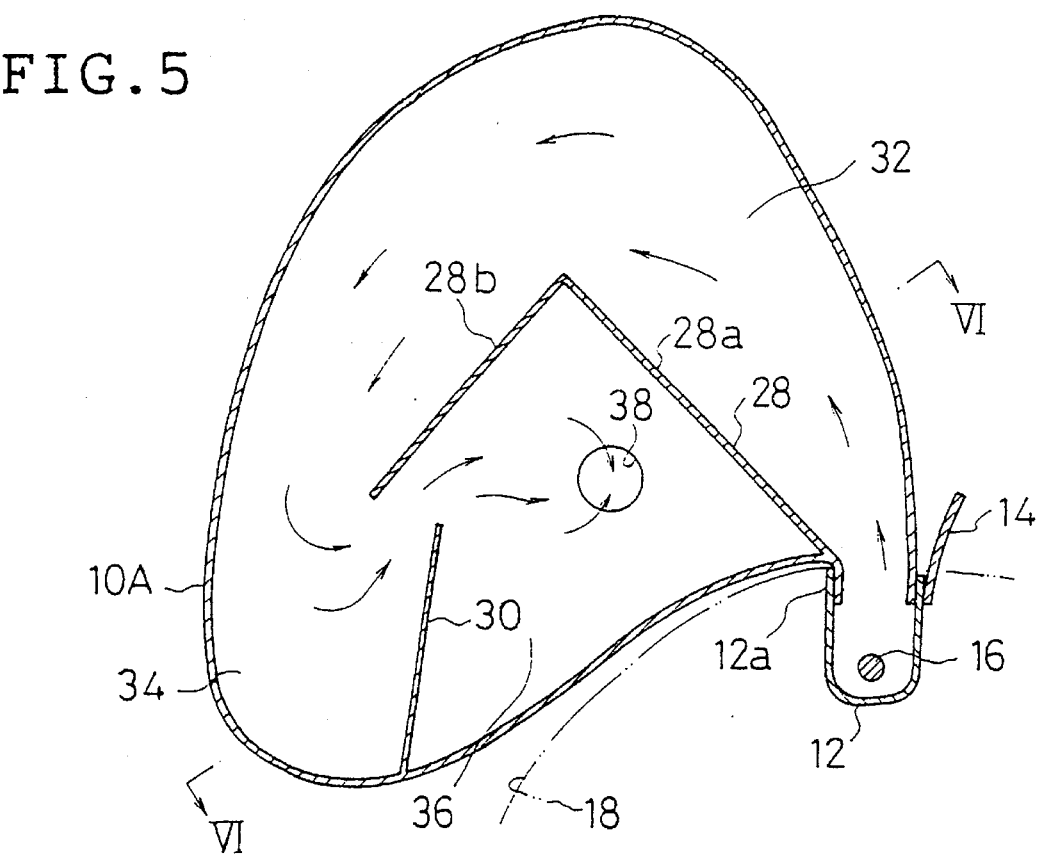
FIG. 5 is a sectional view of the air bag in its deployed sate in accordance with the embodiment shown in FIG. 4.
Figure 6:
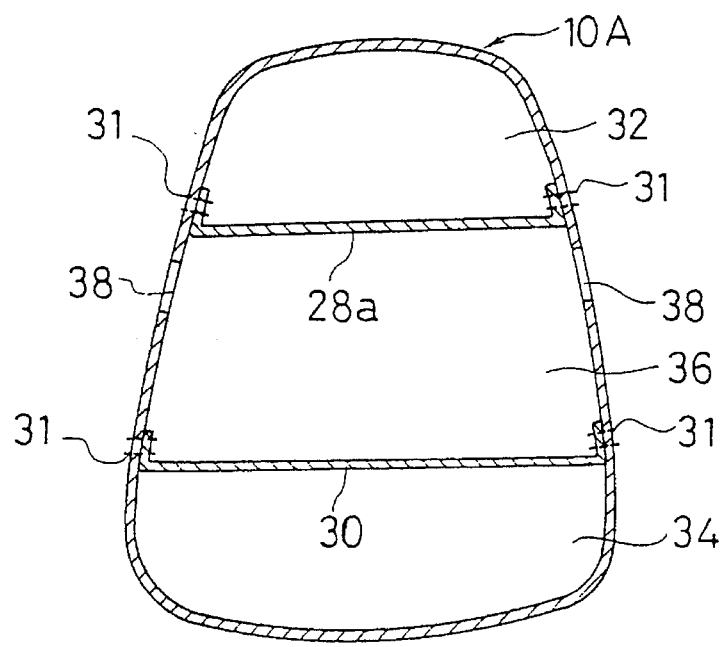
FIG. 6 is a sectional view taken along a line VI—VI in FIG. 5.

FIGS. 4 through 6 show an air bag 10A for a vehicle with a first guide member 28 and a second guide member 30. The first guide member 28 comprises a first piece 28a and a second piece 28b which cross at a right angle each other. The rear end of the first piece 28a is connected to an edge portion 12a, disposed nearer the rear side of the vehicle than the other edge portion, of the container 12. The second piece 28b is diagonally disposed to extend downwardly from the front end of the first piece 28a. The first piece 28a and the second piece 28b have both sides sewn on the sides of the air bag 10A by threads 31.

The guide member 30 is disposed nearly along the vertical direction, the lower end of which is sewn on the lower surface of the air bag 10A, and the both sides of which are sewn on the sides of the air bag 10A. The upper end of the guide member 30 is positioned somewhat nearer the rear side of the air bag (the front side of the vehicle) than the lower end of the second piece 28b of the first guide member 28. The upper end of the second guide member 30 is disposed in substantially the same height as that of the lower end of the second piece 28b.

Gases sent from the inflator 16 into the air bag 10A flow forward through a section above the first guide member 28 so as to deploy an upper chamber 32 of the air bag 10A and then bump against an inner surface of the air bag 10A to change its course downwardly. And after that, the gases deploy a front chamber 34 surrounded by a lower front surface of the air bag 10A and the second guide member 30. Furthermore, the gases pass between the second piece 28b of the first member 28 and the second guide member 30 to deploy a middle chamber 36 surrounded by the guide members 28, 30 and the lower surface of the air bag 10A.

In this embodiment, as the inflator 16 operates, the upper chamber 32 of the air bag 10A is initially dployed, the front chamber 34 is subsequently deployed, and then the middle chamber 36 is deployed. Since the front chamber 34 is deployed in the early stage of the operation of the inflator, the air bag 10A is capable of restraining the waist of the occupant in the early stage of the deployment. Since the vent holes 38 are disposed to face the middle chamber 36, gases from the inflator 16 do not flow out through the vent holes 38 in the early stage of the operation of the inflator. Therefore, the amount of the gases generated by the inflator at this point contributes to deploy the air bag 10A.

Therefore, also according to this embodiment, the air bag 10A can be rapidly enough deployed even with a reduced output of the inflator Though the air bag for an occupant in a passenger seat is disposed on the upper surface of the instrument panel 18 in the above embodiment, the present invention is applied even when the air bag is disposed on a surface, facing the occupant, of the instrument panel. As a matter of course, the present invention can be applied to an air bag for an occupant in a rear seat.

As mentioned above, in the air bag for a vehicle of the present invention, a portion of the air bag corresponding to the waist of an occupant is initially deployed to protect the lower part of the occupant when a vehicle comes into collision, and after that, the whole air bag is rapidly deployed without wasting gases to protect the body of the occupant. In addition the air bag of the present invention allows the output of the inflator to be reduced. No or little gas flows out trough the vent holes in the early stage of the deployment of the air bag. Therefore, the air bag can be enough widely deployed in time to protect the occupant even when the air bag has a large volume.

What I claim is:

1. An air bag attached to an air bag device having a container and an inflator for inflating the air bag, comprising, a panel for constituting the air bag, said panel including a rear portion attached to the container and having an opening for receiving gas from the inflator, a front portion located at a side opposite to the rear portion, upper and lower portions located between the front and rear portions, and two side portions located between the front and rear portions, and a guide member having first and second pieces fixed between the two side portions in the panel, said first piece extending diagonally upwardly from a lower end near the opening to form an upper chamber and said second piece extending diagonally downwardly from the lower end to form a lower chamber so that a middle chamber is defined by the front portion and first and second pieces, said gas generated by the inflator and flowing into the air bag through the opening, firstly, entering into both the upper and lower chambers to expand the same and then flowing into the middle chamber.

2. An air bag as claimed in claim 1, wherein said side portions has vent holes communicating between the middle chamber and atmosphere so that the gas passing only through the upper and lower chambers and entering in the middle chamber is exhausted after the air bag is inflated.

3. An air bag as claimed in claim 2, wherein said upper chamber is defined between the first piece and the upper portion, and the lower chamber is defined between the second piece and the lower portion.

4. An air bag as claimed in claim 3, wherein said middle chamber communicates the upper chamber through a space above an upper end of the first piece, and the lower chamber through a space below a lower end of the second piece.

5. An air bag attached to an air bag device having a container and an inflator for inflating the air bag, comprising, a panel for constituting the air bag, said panel including a rear portion attached to the container and having an opening for receiving gas from the inflator, a front portion located at a side opposite to the rear portion, upper and lower portions located between the front and rear portions, and two side portions located between the front and rear portions, a first guide member fixed between the two side portions in the panel, said first guide member extending diagonally upwardly from a lower end adjacent the opening to form an upper chamber, said gas generated by the inflator flowing into only the upper chamber through the opening, and a second guide member fixed between the two side portions in the panel, said second guide member extending upwardly from the lower portion to form a front chamber between the front portion and the second guide member and a middle chamber between the first and second guide members so that the gas passing through the upper chamber flows into the middle chamber through the front chamber.

6. An air bag as claimed in claim 5, wherein said first guide member includes a first and second pieces, said first piece extending upwardly from the lower end and the second piece extending downwardly from an upper end of the first piece, said second piece having a lower end situated between an upper end of the second guide member and the front portion so that the gas in the front chamber enters into the middle chamber through a space between the second piece and the second guide member.

7. An air bag as claimed in claim 6, wherein said side portions have vent holes communicating between the middle chamber and atmosphere so that the gas entering into the middle chamber is exhausted after the air bag is inflated.

8. An air bag as claimed in claim 7, wherein said lower end of the second piece is disposed at substantially the same height as the upper end of the second guide member.

* * * * *